United States Patent
Hosny

(10) Patent No.: US 9,754,289 B2
(45) Date of Patent: *Sep. 5, 2017

(54) SYSTEMS AND METHODS FOR PROVIDING RECOMMENDATIONS TO RESIDENTIAL RELOCATORS

(71) Applicant: MasterCard International Incorporated, Purchase, NY (US)

(72) Inventor: Ahmed Hosny, Dublin (IE)

(73) Assignee: MasterCard International Incorporated, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/188,599

(22) Filed: Jun. 21, 2016

(65) Prior Publication Data

US 2016/0300267 A1 Oct. 13, 2016

Related U.S. Application Data

(63) Continuation of application No. 14/620,613, filed on Feb. 12, 2015, now Pat. No. 9,373,131.

(51) Int. Cl.
*G06F 17/00* (2006.01)
*G06Q 30/02* (2012.01)
*G06F 17/30* (2006.01)

(52) U.S. Cl.
CPC ..... *G06Q 30/0261* (2013.01); *G06F 17/3087* (2013.01); *G06F 17/30241* (2013.01); *G06F 17/30528* (2013.01); *G06F 17/30867* (2013.01); *G06Q 30/0255* (2013.01)

(58) Field of Classification Search
CPC ..................................................... G06Q 30/02
USPC ........................................................ 235/375
See application file for complete search history.

(56) References Cited

U.S. PATENT DOCUMENTS

| | | |
|---|---|---|
| 6,370,513 B1 | 4/2002 | Kolawa et al. |
| 6,741,188 B1 | 5/2004 | Miller et al. |
| 7,385,501 B2 | 6/2008 | Miller et al. |
| 7,525,450 B2 | 4/2009 | Miller et al. |
| 7,565,157 B1 | 7/2009 | Ortega et al. |
| 7,774,002 B1 | 8/2010 | Ortega et al. |
| 7,774,003 B1 | 8/2010 | Ortega et al. |
| 7,843,331 B2 | 11/2010 | Miller et al. |
| 7,843,332 B2 | 11/2010 | Miller et al. |
| 7,847,685 B2 | 12/2010 | Miller et al. |
| 7,859,402 B2 | 12/2010 | Miller et al. |

(Continued)

*Primary Examiner* — Jamara Franklin
(74) *Attorney, Agent, or Firm* — Armstrong Teasdale LLP

(57) ABSTRACT

A method for determining a relocation recommendation for a relocating cardholder relocating from a first location to a target location is provided. The method is implemented using a relocation recommendation (RR) computing device in communication with a memory. The method includes receiving, from a cardholder device, a cardholder identifier for the relocating cardholder, and at least one of a general target area and the target location. The method also includes determining an area of interest for the relocating cardholder based at least in part on payment card transaction data at the first location, identifying at least one other cardholder having initiated payment card transactions within the target location and having the same area of interest as the relocating cardholder, determining at least one target merchant located within the target location that is associated with the area of interest, and transmitting, to the cardholder device, a relocation recommendation.

20 Claims, 8 Drawing Sheets

(56) References Cited

U.S. PATENT DOCUMENTS

| | | |
|---|---|---|
| 7,982,599 B2 | 7/2011 | Miller et al. |
| 8,055,282 B1 | 11/2011 | Ortega et al. |
| 8,437,778 B1 | 5/2013 | Ortega et al. |
| 2011/0191184 A1 | 8/2011 | Blackhurst et al. |
| 2011/0246306 A1 | 10/2011 | Blackhurst et al. |
| 2014/0108320 A1 | 4/2014 | Baca et al. |

SYSTEMS AND METHODS FOR PROVIDING RECOMMENDATIONS TO RESIDENTIAL RELOCATORS

CROSS REFERENCE TO RELATED APPLICATIONS

This application is a continuation application of U.S. patent application Ser. No. 14/620,613, filed Feb. 12, 2015, entitled "Systems AND METHODS FOR PROVIDING RECOMMENDATIONS TO RESIDENTIAL RELOCATORS", the disclosure of which is hereby incorporated herein by reference in its entirety.

BACKGROUND OF THE DISCLOSURE

This disclosure relates generally to a payment processing network and, more specifically, to systems and methods for providing recommendations to relocating cardholders based on payment card transaction data.

Cardholders (e.g., an entity using a payment card such as a credit card, a debit card, or a prepaid card) initiate payment card transactions to purchase goods and services from merchants. Transaction data associated with these payment transactions are received and processed over a payment processing network. The transaction data may include, for example, cardholder data, merchant data, a merchant location, and a timestamp associated with the transaction.

A person relocating from "a prior location" to a new residence, or "target location," may be unfamiliar with the target location and the merchants near the target location. People may have difficulties finding advice about the target location such as where they wish to live or what merchants they prefer to visit. Currently, users may be forced to perform individual research for each "area of interest" (e.g., hobbies, dining, and entertainment) to fulfill each of their distinct needs, or use other forms of research such as word of mouth, physical exploration, newspapers, and the like.

Known methods also include performing individual store locator searches online on each merchant's website, where available. In other words, using these known methods, cardholders are required to perform extensive research to be able to visit merchants at the target location that are similar to the merchants they visited at their prior location. Further, a cardholder may not yet have selected an exact target location and may desire recommendations not just on suitable merchants, but on where to live as well. It may be cumbersome to perform individual research to find a suitable target location that is near merchants the cardholder wants to visit.

BRIEF DESCRIPTION OF THE DISCLOSURE

In one aspect, a method for determining a relocation recommendation for a relocating cardholder relocating from a first location to a target location is provided. The method is implemented using a relocation recommendation (RR) computing device in communication with a memory. The method includes the step of receiving, from a cardholder device, a cardholder identifier for the relocating cardholder, and at least one of a general target area and the target location. The method also includes the step of determining, by the RR computing device, an area of interest for the relocating cardholder based at least in part on payment card transaction data at the first location. The method further includes the step of identifying at least one other cardholder having initiated payment card transactions within the target location and having the same area of interest as the relocating cardholder. The method also includes the step of determining at least one target merchant located within the target location that is associated with the area of interest based, at least in part, on payment card transaction data of the at least one other cardholder. The method further includes the step of transmitting, to the cardholder device, a relocation recommendation including at least one of a target location and a name and a location of the at least one target merchant to the relocating cardholder.

In another aspect, a system for providing recommendations to a relocating cardholder relocating from a first location to a target location is provided. The system includes a transaction database configured to store transaction data received through a payment processing network, and a relocation recommendation (RR) computing device configured to be coupled to the transaction database. The RR computing device is further configured to receive, from a cardholder device, a cardholder identifier for the relocating cardholder, and at least one of a general target area and the target location. The RR computing device is also configured to determine an area of interest for the relocating cardholder based at least in part on payment card transaction data at the first location, identify at least one other cardholder having initiated payment card transactions within the target location and having the same area of interest as the relocating cardholder, and determine at least one target merchant located within the target location that is associated with the area of interest based, at least in part, on payment card transaction data of the at least one other cardholder. The RR computing device is further configured to transmit, to the cardholder device, a relocation recommendation including at least one of a target location and a name and a location of the at least one target merchant to the relocating cardholder.

In yet another aspect, a non-transitory computer readable medium that includes computer executable instructions for providing recommendations to a relocating cardholder relocating from a first location to a target location is provided. When executed by a relocation recommendation (RR) computing device, the computer executable instructions cause the RR computing device to receive, from a cardholder device, a cardholder identifier for the relocating cardholder, and at least one of a general target area and the target location. The computer executable instructions also cause the RR computing device to determine an area of interest for the relocating cardholder based at least in part on payment card transaction data at the first location, identify at least one other cardholder having initiated payment card transactions within the target location and having the same area of interest as the relocating cardholder, and determine at least one target merchant located within the target location that is associated with the area of interest based, at least in part, on payment card transaction data of the at least one other cardholder. The computer executable instructions further cause the RR computing device to transmit, to the cardholder device, a relocation recommendation including at least one of a target location and a name and a location of the at least one target merchant to the relocating cardholder.

BRIEF DESCRIPTION OF THE DRAWINGS

FIG. 1 is a schematic diagram illustrating an example multi-party transaction card industry system for authorizing payment card transactions in which a cardholder performs merchant transactions that may be used to build relocation recommendations.

FIG. 2 is a simplified block diagram of an example relocation recommendation (RR) computer system for providing relocation recommendations to a cardholder.

FIG. 3 is an expanded block diagram of an example embodiment of server architecture of a relocation recommendation (RR) computer system including other computer devices in accordance with one embodiment of the present disclosure.

FIG. 4 illustrates an example configuration of a user system operated by a user, such as the cardholder shown in FIG. 1.

FIG. 5 illustrates an example configuration of a server system such as the server system shown in FIGS. 2 and 3.

FIG. 6 shows an example configuration of an environment in which a cardholder relocates from one location to another.

FIG. 7 shows an example method for generating relocation recommendations and providing them to the cardholder.

FIG. 8 shows an example configuration of a database within a computing device, along with other related computing components, that may be used to generate relocation recommendations in a payment card transaction environment.

Like numbers in the Figures indicate the same or functionally similar components.

DETAILED DESCRIPTION OF THE DISCLOSURE

Figure 1:
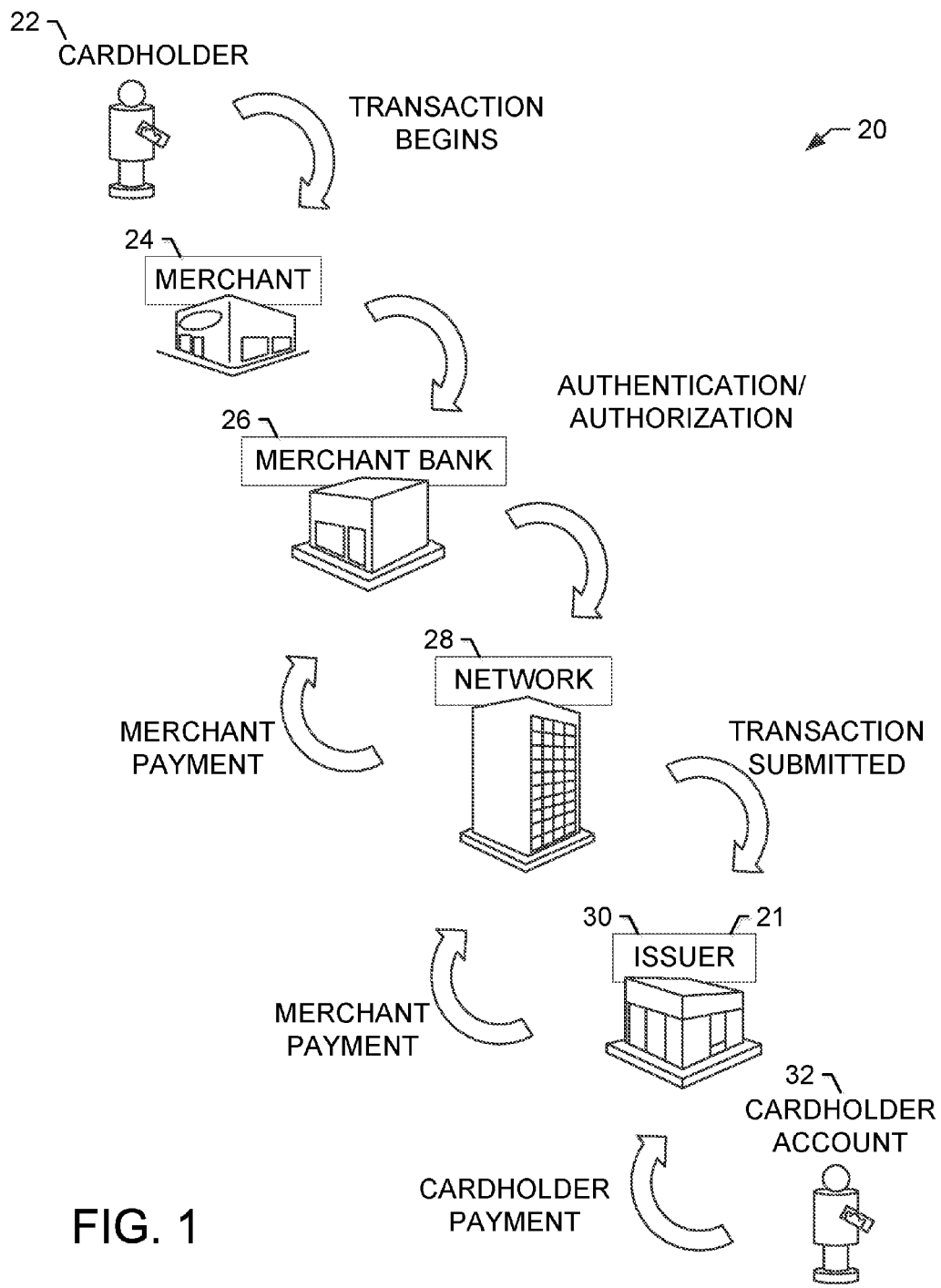
FIGS. 1-8 show example embodiments of the methods and systems described herein.

Systems and methods are described herein for providing relocation recommendations to cardholders who are relocating from a "prior location," such as their previous city of residence, to a "target location," such as a new city or address they are moving to. More specifically, the embodiments described herein relate to a relocation recommendation (RR) computer system that uses historical payment card transaction data as input to generate specific recommendations for a relocating cardholder on merchants of interest to the relocating cardholder at the target location.

To provide relocation recommendations, the RR computer system collects transaction data for both the relocating cardholder and other cardholders. For example, the RR computer system collects transaction data of "native cardholders," (i.e., residents already living at or near the target location), "identical transplants," (i.e., those who relocated to the target location from the same prior location as the relocating cardholder), and "other transplants," (i.e., those who relocated to or near the target location from some other location). The transaction data may include details of where the various cardholders used their payment cards at their respective prior locations (e.g., at which merchant locations) and where the cardholders now use their payment cards at the target location (e.g., at which merchant locations). In addition, the RR computer system receives transaction data from third party databases regarding merchants at the target location.

In the example embodiment, the RR computer system categorizes each merchant according to the merchant's type of business (sometimes referred to as a merchant category). The RR computer system creates a profile for each cardholder, containing identifying information about the cardholder and transaction data of the cardholder. The RR computer system also assigns areas of interest to a cardholder profile.

For example, if a cardholder's transaction data includes transactions at a particular restaurant, (e.g., McDonalds), the RR computer system may assign the restaurant's area of interest, (e.g., "Fast Food") to the cardholder's profile. The RR computer system may use predefined areas of interest, or may create its own list of areas of interest which it may then assign to particular merchants.

More specifically, the RR computer system uses merchant information available in the transaction (e.g., the merchant category code, card acceptor code and location) to more accurately assign areas of interest. The merchant information along with the transaction amount is used to build a probability for the type of transaction performed. This probability is enhanced by looking at the probabilities for other, similar, transactions performed. For example, if the cardholder buys an item for $200 from a sports store, there may be a probability that it is a golf club. If the cardholder spends $20 each week at a golf club, there may be a statistically significant probability that the cardholder plays golf. The RR computer system is also able to aggregate data and determine areas of interest with greater accuracy. Additionally, all probabilities and assumptions are available to the user to verify or modify them when requesting relocation recommendations. This user input of verifying and/or modifying probabilities further helps the RR computer system determine areas of interest with greater specificity and relevance to the cardholder.

The RR computer system then compares the areas of interest of the relocating cardholder to the areas of interest of other cardholders (e.g., native cardholders, identical transplants, and other transplants), and determines whether the relocating cardholder's areas of interest match those of any other cardholders at the target location. The RR computer system locates merchants associated with the relevant areas of interest at the target location (e.g., from the transaction data of those other cardholders) and presents those merchant locations to the user as relocation recommendations.

In the example embodiment, the RR computer system receives a prior location and a target location as input from the relocating cardholder and provides merchant recommendations. This input could be received from the relocating cardholder through a website in communication with the RR computer system, or through an application (e.g., a desktop computer or smartphone application) in communication with the RR computer system. In another embodiment, the relocating cardholder has not selected a target location and instead provides only a general target area. In this embodiment, the RR computer system also provides relocation recommendations in the form of suitable target locations (e.g., target locations having a relatively high number of merchants matching the relocating cardholder's areas of interest). In yet another embodiment, the RR computer system combines the activities of various related people (e.g., cardholding members of a family). In other words, the RR computer system merges transaction data from multiple payment cards and provides relocation recommendations based on this larger and more comprehensive set of transaction records.

At least one of the technical problems addressed by this system includes: (i) the inability for a consumer to receive a recommendation as to where the consumer should reside within the target location wherein the recommendation is based on the consumer's past payment transactions, and (ii) the inability for a consumer that is relocating from a first location to a new residence at a target location to receive recommendations as to what merchants are nearby the new residence that are similar to the merchants the consumer frequented while residing at the first location.

The methods and systems described herein may be implemented using computer programming or engineering techniques including computer software, firmware, hardware, or any combination or subset thereof, wherein the technical effects may be achieved by performing at least one of the following steps: (a) determining an area of interest of the cardholder based at least in part on historical payment card transaction data at the prior location, (b) identifying at least one other cardholder at the target location having the same area of interest, (c) determining at least one merchant associated with the area of interest using payment card transaction data of the at least one other cardholder at the target location, and (d) transmitting a recommendation including the at least one merchant to the cardholder.

The resulting technical benefits achieved by this system include at least one of: (i) providing a unified system that avoids disparate merchant search efforts and provides actionable relocation recommendations, (ii) providing improved efficiency and speed in providing such relocation recommendations to cardholders by providing a system that is specifically configured to utilize transaction data to provide such recommendations, and (iii) using past historical transaction data for other consumers to make merchant recommendations and relocation recommendations to a target consumer that has a similar purchase history to that of the other consumers. Thus, the system is better able to serve relocation recommendations to cardholders in an accelerated fashion, which results in a better cardholder experience with the payment processor and the amount of queries such that overall payment processor system quality is improved.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile computing devices, or desktop, laptop computing devices, and the like. Each type of transaction card can be used as a method of payment for performing a transaction. As used herein, the term "payment account" is used generally to refer to the underlying account with the transaction card.

As used herein, the term "cardholder" refers to any person who uses a transaction card, payment card, or financial transaction card to perform transactions. Further, as used herein, the term "relocating cardholder" refers to a cardholder who is relocating physically from one location to another. For example, the relocating cardholder may be switching his or her place of residence from one city to another, one zip code to another, one state to another, and the like. The term "prior location," as used herein, refers to a physical location where a cardholder resides or has resided in the recent past (e.g., the relocating cardholder's prior city of residence). The term "target location," as used herein, refers to a physical location where a cardholder plans to relocate to or has very recently relocated to (e.g., the city to which the relocating cardholder is moving). The term "identical transplant," as used herein, refers to a person who has recently relocated from the same prior location to the same target location as the relocating cardholder. The term "other transplant," as used herein, refers to a person who has recently relocated from any other prior location to the exact same target location as the relocating cardholder. The term "native cardholder," as used herein, refers to a cardholder who has resided at the target location (e.g., for some predetermined length of time).

The following detailed description illustrates embodiments of the disclosure by way of example and not by way of limitation. It is contemplated that the disclosure has general application to financial transactions in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions which are used to generate relocation recommendations for a cardholder 22. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to the consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." Cardholder 22 tenders payment for a purchase using a transaction card, then merchant 24 requests authorization from a merchant bank 26 for the amount of the purchase. The request may be performed over the telephone, but is usually performed through the use of a point-of-sale terminal, which reads cardholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder 22's account 32 is in good standing and whether the purchase is covered by cardholder 22's available credit line. Based on these determinations, the request for authorization will be declined or accepted. If the request is accepted, an authorization code is issued to merchant 24.

When a request for authorization is accepted, the available credit line of cardholder 22's account 32 is decreased. Normally, a charge for a payment card transaction is not posted immediately to cardholder 22's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2). Further, in some embodiments, interchange network 28 and/or issuer bank 30 stores in database 120 information associated with a loyalty program such as, for example, an amount of loyalty points associated with the cardholder and/or the transaction.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21.

Further, the interchange network 28 may collect and store transaction data for payment card transactions in an internal database. A relocation recommendation (RR) computer system (not shown in FIG. 1) analyzes this transaction history database and develops relocation recommendations for a relocating cardholder (e.g., cardholder 22).

Figure 2:
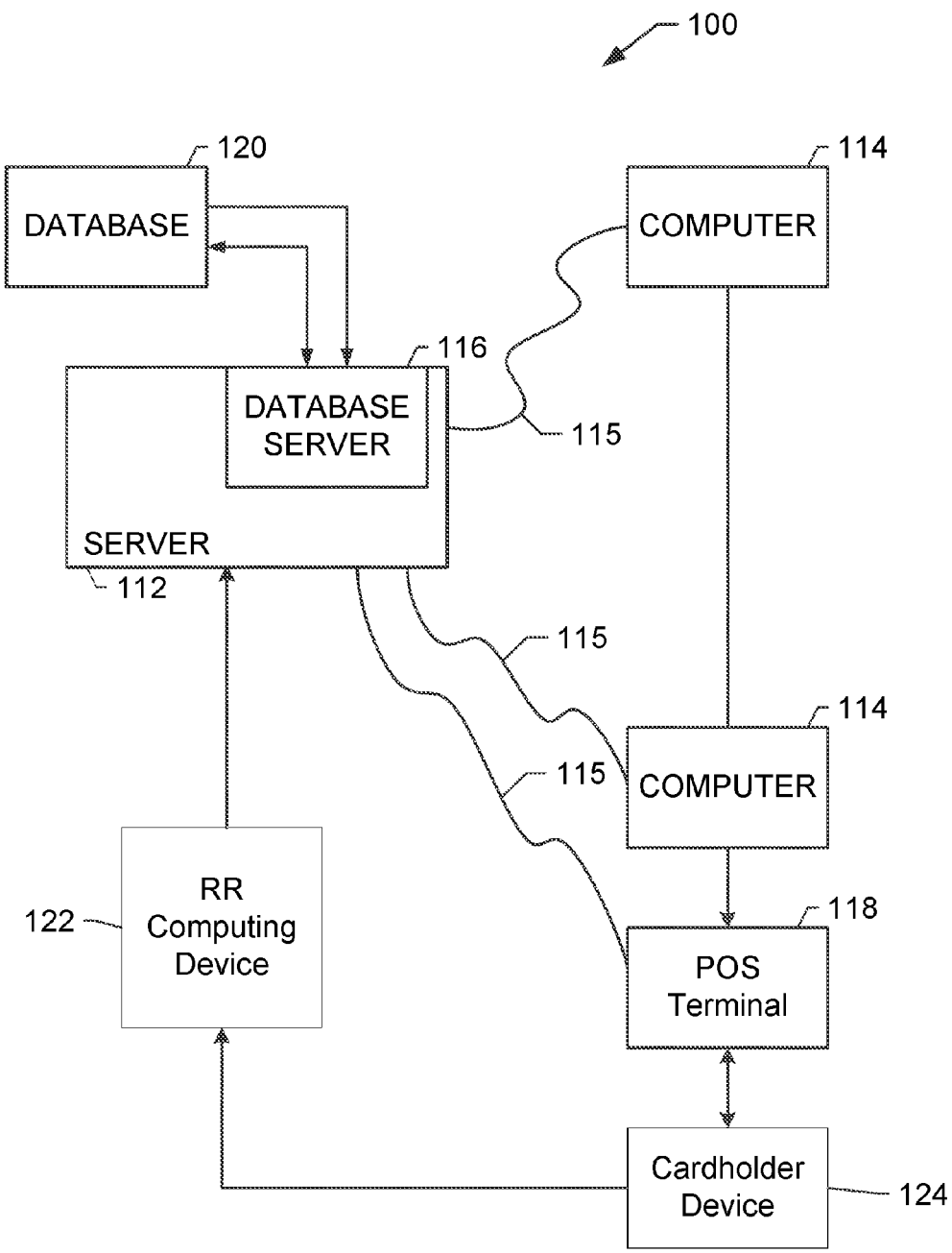

FIG. 2 is a simplified block diagram of an example relocation recommendation (RR) computer system 100 with an RR computing device 122 for providing relocation recommendations to a cardholder. In the example embodiment, RR computing device 122 is part of RR computer system 100. In other embodiments, RR computing device 122 is a separate computing device in communication with RR computer system 100. RR computing device 122 is specifically programmed to perform the steps described herein. RR computer system 100 includes a plurality of computer devices connected in communication in accordance with the present disclosure. In the example embodiment, RR computer system 100 may be used to collect transaction history data from one or more cardholders during payment card transactions. More specifically, in the example embodiment, RR computer system 100 includes a server system 112. Server system 112 communicates with a point-of-sale (POS) terminal 118, which is located at a merchant location, such as merchant 24 (shown in FIG. 1). Server system 112 also communicates with other client systems 114 associated with merchants, merchant banks, payment networks, issuer banks, and/or cardholders.

In the example embodiment, client systems 114 are computers including a web browser, such that server system 112 is accessible to client systems 114 using the Internet or other network. Client systems 114 are interconnected to the network through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a smartphone, desktop or laptop computer, or other web-based connectable equipment.

In the example embodiment, RR computer system 100 also includes POS terminals 118, which may be connected to client systems 114 and may be connected to server system 112. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store area of interest data, cardholder demographical data, and/or relocation recommendations data.

In the example embodiment, one of client systems 114 may be associated with an acquirer bank while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28 or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In the example embodiment, RR computing device 122 does not consist of generic computer hardware, nor does it require merely generic computer instructions to perform the above functions. Rather, RR computing device 122 is a specific and customized computer device built to perform the specific function of delivering relocation recommendations. In the example embodiment, RR computing device 122 is tailored to communicate in specific ways with server system 112 and cardholder device 124. RR computing device 122 is specifically configured to perform one or more of the data manipulation tasks described herein, such as receiving area of interest data for merchants and cardholders, building a profile for the cardholder, assigning demographical information, transaction history, and areas of interest to cardholder profiles, identifying one or more other cardholders residing within the target location that have a profile similar to the cardholder, retrieving one or more merchant identifiers and locations associated with the other cardholder, and generating relocation recommendations that are then transmitted to the cardholder.

Figure 3:
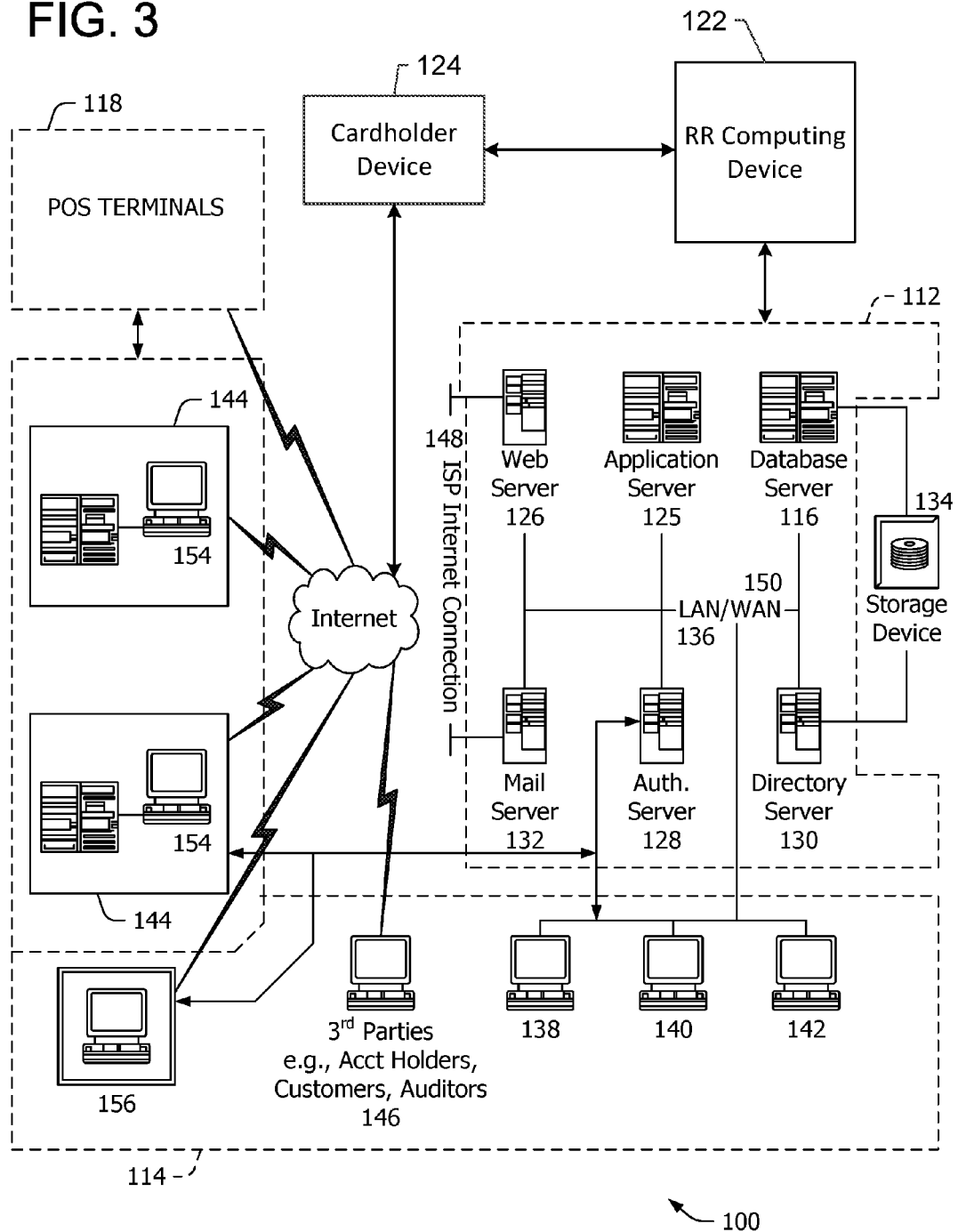

FIG. 3 is an expanded block diagram of an example embodiment of server architecture of relocation recommendation (RR) computer system 100 including other computer devices in accordance with one embodiment of the present disclosure. Components in RR computer system 100, identical to components of RR computer system 100 (shown in FIG. 2), are identified in FIG. 3 using the same reference numerals as used in FIG. 2. RR computer system 100 includes server system 112, client systems 114, and POS terminals 118. Server system 112 further includes database server 116, a web server 126, a user authentication system 106, and an application server 125. A storage device 134 is coupled to database server 116. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network 115. Workstations 138, 140, and 142 are coupled to LAN 136 using an Internet link or are connected through an Intranet. In the example embodiment, RR computing device 122 is in communication with server system 112 and cardholder device 124. Cardholder device 124 is also connected to the Internet and may be a smartphone, personal computer, tablet computer, or similar computing device.

Each workstation 138, 140, and 142 is a computer with Internet access. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and third parties 146 (e.g., account holders, customers, auditors, developers, cardholders, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet. In addition, and rather than WAN 150, local area network 136 could be used in place of WAN 150.

In the example embodiment, any authorized individual having a workstation 154 can access RR computer system 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
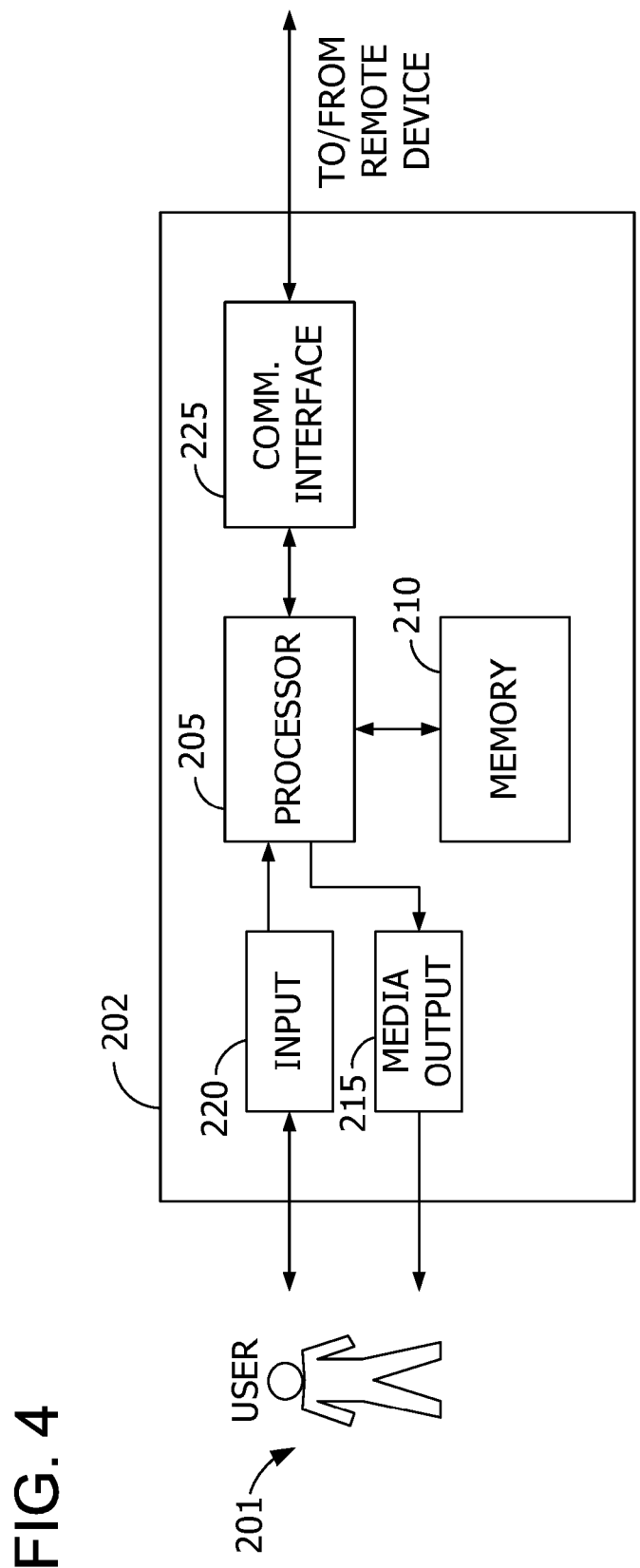

FIG. 4 illustrates an example configuration of a user system 202 (similar to cardholder device 124, shown in FIG. 2) operated by a cardholder 201, such as cardholder 22 (shown in FIG. 1) for receiving relocation recommendations from, or otherwise interacting with, RR computer system 100 (shown in FIGS. 2 and 3). User system 202 may include, but is not limited to, client systems 114, 138, 140, and 142, POS terminals 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to cardholder 201. Media output component 215 is any component capable of conveying information to cardholder 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from cardholder 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to cardholder 201 via media output component 215 and, optionally, receiving and processing input from input device 220. A user interface may include, among other possibilities, a web browser and client application. Web browsers enable users, such as cardholder 201, to display and interact with media and other information typically embedded on a web page or a website from server system 112. A client application allows cardholder 201 to interact with a server application from server system 112.

Figure 5:
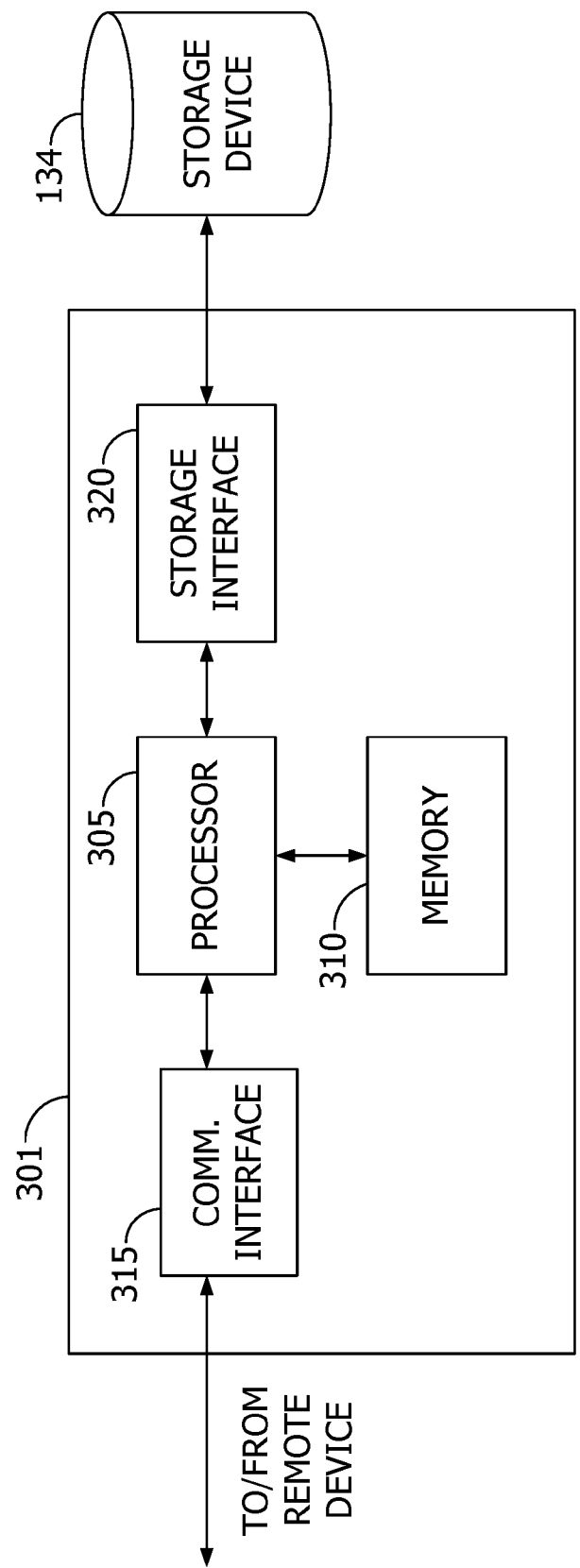

FIG. 5 illustrates an example configuration of a server system 301 such as server system 112 (shown in FIGS. 2 and 3) used for providing relocation recommendations. Server system 301 may include, but is not limited to, database server 116, application server 125, web server 126, authentication server 128, and directory server 130 (all shown in FIG. 3). In some embodiments, server system 301 is similar to server system 112 (shown in FIGS. 2 and 3) or RR computer system 100 (shown in FIGS. 2 and 3).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
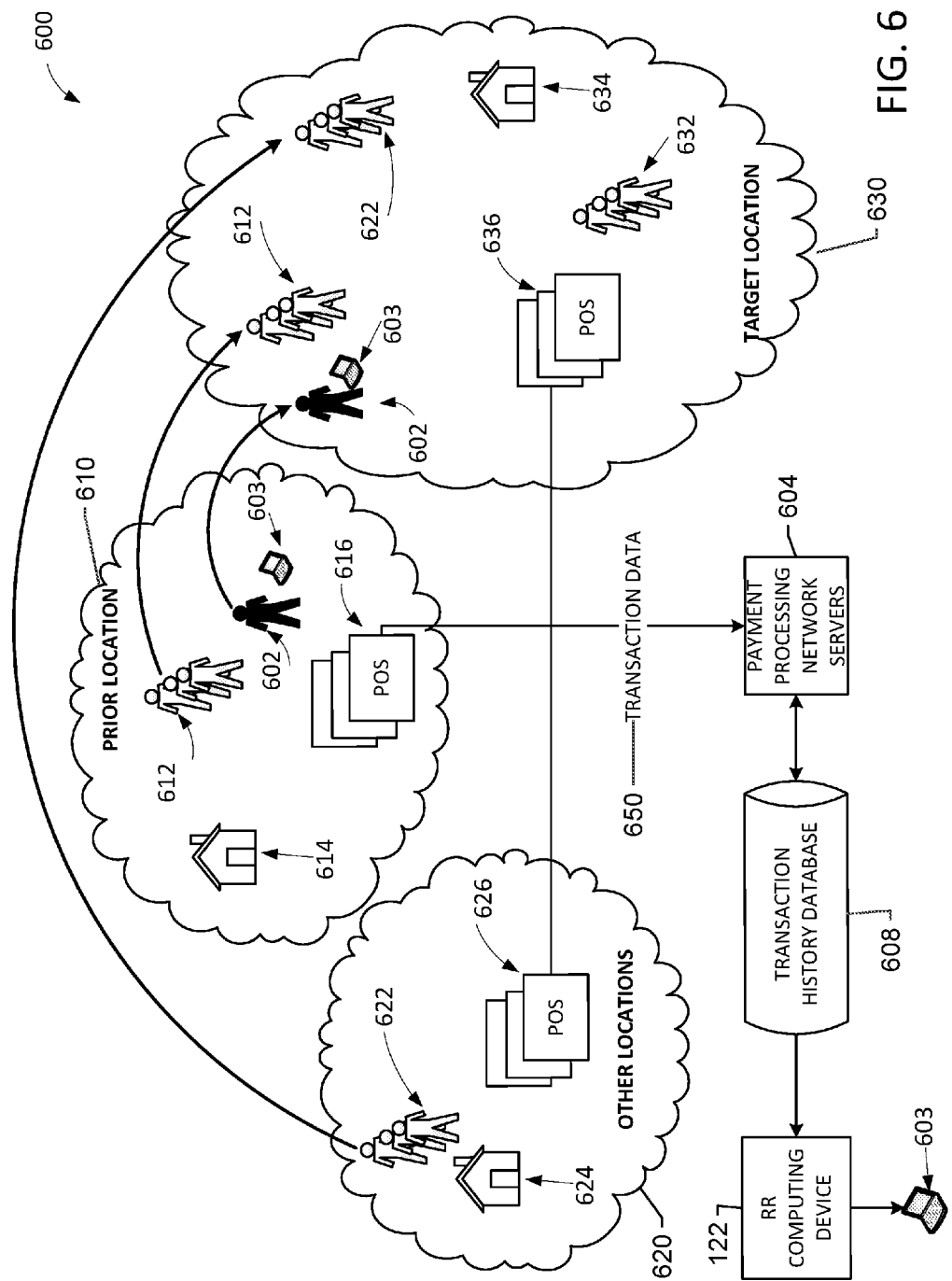

FIG. 6 shows an example configuration of an environment 600 in which relocation recommendation (RR) computing device 122 (shown in FIGS. 2 and 3) provides relocation recommendations to a relocating cardholder 602. In some embodiments, relocating cardholder 602 is similar to cardholder 22 (shown in FIG. 1). In the example embodiment, relocating cardholder 602 relocates (i.e., changes his or her place of residence) from a prior location 610 to a target location 630. Prior location 610 and target location 630 may represent a city, a state, an area represented by a zip code, and the like. As an example, relocating cardholder 602 relocates from Chicago, Ill. to St. Louis, Mo., where prior location 610 represents Chicago, Ill. and target location 630 represents St. Louis, Mo. In the example embodiment, relocating cardholder 602 also has a computer device 603 that is used to receive relocation recommendations. Relocating cardholder 602 participates in payment card transactions using POS devices 616 located at each merchant within prior location 610. Relocating cardholder 602 also maintains at least one prior residence 614 within prior location 610. In the example embodiment, relocating cardholder 602 relocates such that his or her residence changes from prior residence 614 to one or more of target residences 634, (i.e., one or more places of residence located within target location 630).

In the example embodiment, identical transplants 612 also relocate (or have, in the past, relocated) from prior location 610 to target location 630, similar to relocating cardholder 602 (e.g., from Chicago, Ill. to St. Louis, Mo.).

In some embodiments, identical transplants 612 comprise one or more relocating cardholders. In other embodiments there may be no identical transplants 612, (i.e., no cardholders who have relocated from prior location 610 to target location 630). Similar to relocating cardholder 602, identical transplants 612 also participate in payment card transactions using POS devices 616 located at merchants within prior location 610. At target location 630, identical transplants participate in payment card transactions using POS devices 636 located at merchants within target location 630.

In the example embodiment, other transplants 622 relocate (or have, in the past, relocated) from other locations 620 to target location 630 (e.g., from San Francisco, Calif., or from Houston, Tex., or other cities, to St. Louis, Mo.). Other locations 620 represent any physical locations that are not prior location 610 or target location 630. In the example embodiment, other transplants 622 lived in one or more other residences 624, and change residences to one or more target residences 634. Somewhat similar to relocating cardholder 602, other transplants 622 participate in payment card transactions using POS devices 626 located at merchants within other locations 620. Further, in the example embodiment, native cardholders 632 already reside at target location 630, for example, native residents of St. Louis, Mo.

In the example embodiment, POS devices 616, POS devices 626, and POS devices 636 are part of a payment processing network. For example, when a cardholder (e.g., relocating cardholder 602) participates in a payment transaction at one of POS devices 616, the transaction generates several data points (e.g., transaction date/time, transaction amount, merchant identifier, goods or services purchased, etc.). In the example embodiment, this data (i.e., transaction data 650) is transmitted to payment processing network servers 604, which are also part of the payment processing network, in the example embodiment. Payment processing network servers 604 in turn transmit transaction data 650 to a transaction history database 608. In some embodiments, transaction history database 608 is one of payment processing network servers 604. In other embodiments, transaction history database 608 is a device separate from payment processing network servers 604. In still other embodiments, transaction history database 608 receives transaction data 650 directly from POS devices 616, POS devices 626, and POS devices 636.

In the example embodiment, RR computing device 122 analyzes transaction data 650 as received from transaction history database 608. In some embodiments, transaction history data contains not just transactions using a cardholder's current payment card, but also linked data from previous payment cards, such as the cardholder's expired payment cards. RR computing device 122 may also receive demographical data about the cardholder, so the transaction data may also be linked up with other data to create a cardholder profile that includes demographical data, transaction data, and area of interest data. Demographical data may include data such as the cardholder's age, gender, income level, tax bracket, marital status, number of dependents, and the like.

RR computing device 122 assigns particular areas of interest to transactions within transaction data 650, by determining the appropriate business type for the transaction and/or the merchant where the transaction took place. For example, RR computing device 122 may place a fast food restaurant merchant into the area of interest "Fast Food," a golf club into the area of interest "Recreation," and a sporting goods store in the area of interest "Sporting Goods." RR computing device 122 may place one merchant into more than one area of interest. For example, if a golf club provides a course for playing golf but also sells golf gear, RR computing device 122 may place the golf club in both the "Recreation" and "Sporting Goods" areas of interest, and/or other areas of interest. In some embodiments, RR computing device 122 may also sort merchants into sub-areas of interest. For example, the area of interest "Sporting Goods" may have sub-areas titled "Baseball Equipment," "Football Equipment," "Golf Equipment," and the like.

In some embodiments, RR computing device 122 also receives transaction history data from third party transaction databases (not shown). Third party databases are used to enrich the data and provide missing links. For example, a bank accounts database may be used to link multiple credit card numbers to the same person or family. A retailer database can be used to correlate actual item or stock keeping unit (SKU) data with transaction data. A travel agency database can be used to connect destinations with transaction data. A cable subscriptions database can be used to link transaction data with entertainment preferences.

For example, RR computing device 122 receives transaction history data from a database maintained by a retail store. The retail store database contains item- or SKU-level data about goods or services relocating cardholder 602 purchased over the course of various transactions. In the example embodiment, RR computing device 122 searches for transactions at target location 630 containing the same or similar SKUs as found in relocating cardholder 602's transactions at prior location 610. RR computing device 122 isolates merchants for such transactions, and determines that these merchants may offer relocating cardholder 602's preferred goods or services. In this way, RR computing device 122 determines merchants that may not be the same as those found at prior location 610, but which nevertheless can be recommended to relocating cardholder 602 as merchants that carry relocating cardholder 602's preferred goods or services. As an example, knowing that relocating cardholder 602 purchases baby diapers can be used as an indicator that relocating cardholder 602 has young children. Even if target location 630 does not have relocating cardholder 602's preferred merchant for diapers, RR computing device 122 can search retail databases at target location 630 to return, for example, another merchant that carries the same brand or type of diapers.

RR computing device 122 builds a profile for each cardholder. A cardholder profile comprises data identifying the cardholder, transaction data associated with the cardholder, and area of interest associated with merchants that the cardholder has visited. If a cardholder's transaction data shows transactions at a particular merchant, RR computing device 122 assigns that merchant's area of interest data to that cardholder's profile. Where a cardholder visits a merchant frequently, that merchant's area of interest may be said to be of higher interest to the cardholder. Each area of interest may thus represent a proxy for merchants the cardholder prefers, such that the cardholder may wish to learn about similar merchants (i.e., merchants in that same area of interest) at the target location. For example, if a cardholder's transaction data includes transactions at a particular restaurant (e.g., McDonalds), RR computing device 122 may assign the restaurant's area of interest (e.g., "Fast Food") to the cardholder's profile.

In some embodiments, relocating cardholder 602 asks RR computing device 122 for recommendations on all possible areas of interest associated with relocating cardholder's profile. In other embodiments, RR computing device 122 presents an area of interest list for relocating cardholder 602 to select a particular area of interest for relocation recommendations. RR computing device 122 then compares the areas of interest in relocating cardholder 602's profile to the areas of interest of other cardholders, (e.g., native cardholders 632, identical transplants 612, and other transplants 622), and determines whether relocating cardholder 602's areas of interest match those of any other cardholder at the target location. In one embodiment, RR computing device 122 looks for an exact match between an area of interest of relocating cardholder 602 and areas of interest of other cardholders. For example, relocating cardholder 602's profile may have "Sporting Goods" as one of the areas of interest. RR computing device 122 may search for other cardholder profiles from target location 630 containing the area of interest "Sporting Goods." In other embodiments, RR computing device 122 looks for areas of interest similar to, but not necessarily the same as an area of interest found in relocating cardholder 602's profile. For example, where relocating cardholder 602's profile contains "Sporting Goods," RR computing device 122 may search transaction data 650 for cardholder profiles containing the area of interest "Sporting Goods" but also areas of interest such as "Sporting Events," "Sporting Clubs," "Coaching Services" and the like.

In the example embodiment, RR computing device 122 searches transaction data 650 for cardholder profiles at the target location whose areas of interest match those of relocating cardholder 602. Finding a match, RR computing device 122 determines merchants that a cardholder has visited (based on a profile match), within a predetermined length of time in the past. For example, relocating cardholder 602's profile contains the area of interest "Sporting Goods." RR computing device 122 searches transaction data 650 for cardholder profiles from target location 630 that also contain the area of interest "Sporting Goods." As an example, RR computing device 122 finds a profile for one of identical transplants 612 that also contains the area of interest "Sporting Goods." RR computing device 122 then determines "Sporting Goods" merchants that identical transplant 612 has visited in the past at target location 630. RR computing device 122 then presents those merchant locations to the user as relocation recommendations.

In yet other embodiments, RR computing device 122 also determines similarity between the profile of relocating cardholder 602 and other cardholder profiles based on variables other than area of interest. In these embodiments, RR computing device 122 compares multiple other dimensions of similarity between cardholders (e.g., particular merchant locations, amount of money spent, transaction times/dates, etc.) to arrive at cardholders similar to relocating cardholder 602.

In some embodiments, RR computing device 122 may prioritize recommendations that are developed based on one type of cardholder over another. For example, data from identical transplants 612 may represent the preferences of relocating cardholder 602 most closely. Therefore, RR computing device 122 may, for example, deem transaction data from identical transplants 612 to be the most valuable, followed by transaction data from native cardholders 632, followed by other transplants 622. RR computing device 122 may thus present recommendations developed using transaction data of identical transplants 612 as being higher priority and/or more useful than those developed from other cardholders. For example, where relocating cardholder 602 moves from Chicago, Ill. to St. Louis, Mo., and has "Fast Food" as an area of interest, RR computing device 122 may first search for identical transplants 612 that match those criteria. RR computing device 122 may thus find and provide merchants from target location 630 that more closely match "Fast Food" merchants in prior location 610 (i.e., Chicago, Ill.), compared to target location 630, (i.e., St. Louis, Mo.). As an example, RR computing device 122 may promote those "Fast Food" merchants in St. Louis, Mo. that provide Chicago-style pizza higher than "Fast Food" merchants visited more by native cardholders 632.

In another embodiment, when determining recommended merchants, RR computing device 122 prioritizes certain merchants over others at target location 630, based on cardholders' revealed preference. For example, relocating cardholder 602 may have "Steak Restaurant" as area of interest. Target location 630 may have more than one merchant matching the area of interest "Steak Restaurant," (e.g., two restaurants A and B offering steak at comparable prices). In the example embodiment, RR computing device 122 compares transactions taking place at A and B. RR computing device 122 determines that identical transplants 612 overwhelmingly prefer restaurant A to restaurant B while at target location 630 based on a higher number of transactions by identical transplants 612 at restaurant A. In the example embodiment, RR computing device 122 recommends restaurant A to relocating cardholder 602 instead of restaurant B, or presents a list of restaurants where A is promoted over B. In other embodiments, RR computing device 122 presents merchant recommendations in a list sorted on, for example, proximity to target location 630, frequency of transactions by relocating cardholder 602 at prior location 610, or on other similar variables.

In another embodiment, relocating cardholder 602 asks RR computing device 122 for recommendations on target locations for relocation, providing only a general target area. In the present embodiment, RR computing device 122 first determines merchant areas of interest associated with relocating cardholder 602's profile. RR computing device 122 searches transaction history database 608 for cardholder profiles that include the same or similar areas of interest. It may be appreciated that other locations 620 may comprise any location that is not prior location 610, and many cardholders use POS devices 616, 626, and 636 but may or may not have relocated. Thus, in the present embodiment, RR computing device 122 is not limited in its cardholder profile search to just identical transplants 612, other transplants 622, or native cardholders 632.

In the present embodiment, RR computing device 122 searches for cardholder profiles from the general target area that contain areas of interest matching those of relocating cardholder 602. In particular, RR computing device 122 searches for cardholder profiles showing a high number of transactions in the particular areas of interest of relocating cardholder 602. A high transaction count in those particular areas of interest may signify a closer match to relocating cardholder 602. RR computing device 122 sorts cardholder profiles by transaction count within relocating cardholder 602's specific areas of interest and focuses on a certain number of the top profiles; for example, the top ten profiles. Given these top cardholder profiles, RR computing device 122 queries their transaction history to determine merchants at the cardholders' respective locations. It may be appreciated that these particular merchants are associated with the particular areas of interest of relocating cardholder 602's profile. RR computing device 122 uses location data related to these merchants to recommend target locations to relocating cardholder 602.

As an example, relocating cardholder 602 is a resident of prior location Chicago, Illinois. Relocating cardholder 602's profile contains the area of interest "Sailing Equipment." Relocating cardholder 602 asks RR computing device 122 for target locations for relocating cardholder 602 to relocate to within a general target area. For example, relocating cardholder 602 may provide only the state of California as a general target area to RR computing device 122. RR computing device 122 searches transaction history database 608 for cardholder profiles containing the area of interest "Sailing Equipment." In the example embodiment, RR computing device 122 locates one or more cardholder profiles with a significant number of transactions at merchants categorized within "Sailing Equipment." RR computing device 122 uses location data about these particular merchants to determine that a significant number of "Sailing Equipment" merchants (or a number of "Sailing Equipment" merchants with a high number of transactions) are located in, for example, San Francisco, Calif., Berkeley, Calif., and Los Angeles, Calif. In the example embodiment, RR computing device 122 transmits these locations as recommended target locations to relocating cardholder 602.

Figure 7:
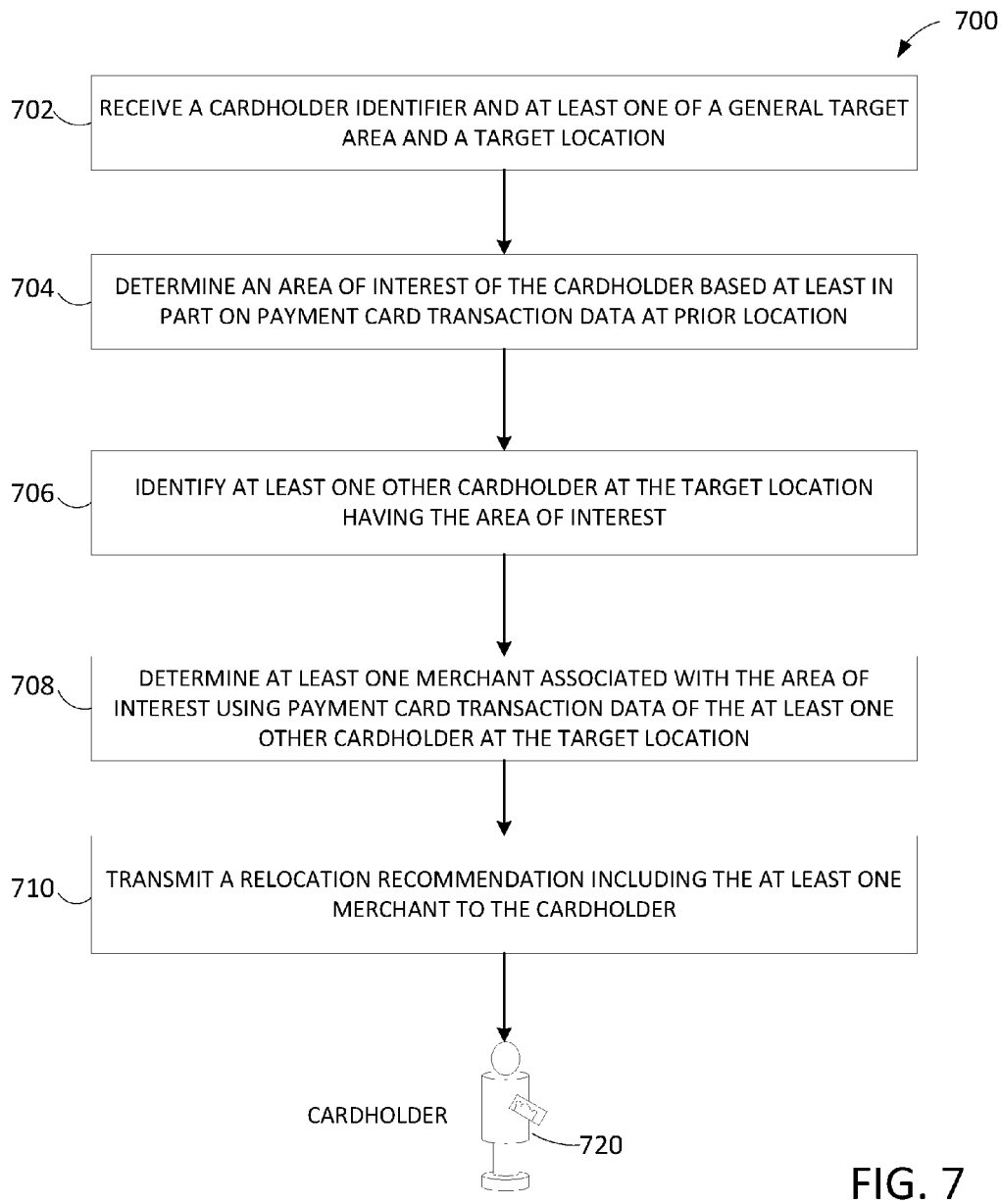

FIG. 7 is an example method 700 implemented by the relocation recommendation (RR) computing device 122 (shown in FIGS. 2 and 3) for providing relocation recommendations to a cardholder 720. In the exemplary embodiment, RR computing device receives 702 a cardholder identifier and at least one of a general target area and a target location from a device operated by cardholder 720. RR computing device 122 determines 704 an area of interest of the cardholder based at least in part on payment card transaction data at the prior location. In the exemplary embodiment, cardholder 720 is a relocating cardholder who is interested in receiving relocation recommendations developed by RR computing device 122. RR computing device 122 identifies 706 at least one other cardholder at the target location having the area of interest. RR computing device 122 determines 708 at least one target merchant associated with the area of interest using payment card transaction data of the at least one other cardholder at the target location. RR computing device 122 transmits 710 a relocation recommendation including the at least one merchant to cardholder 720.

Figure 8:
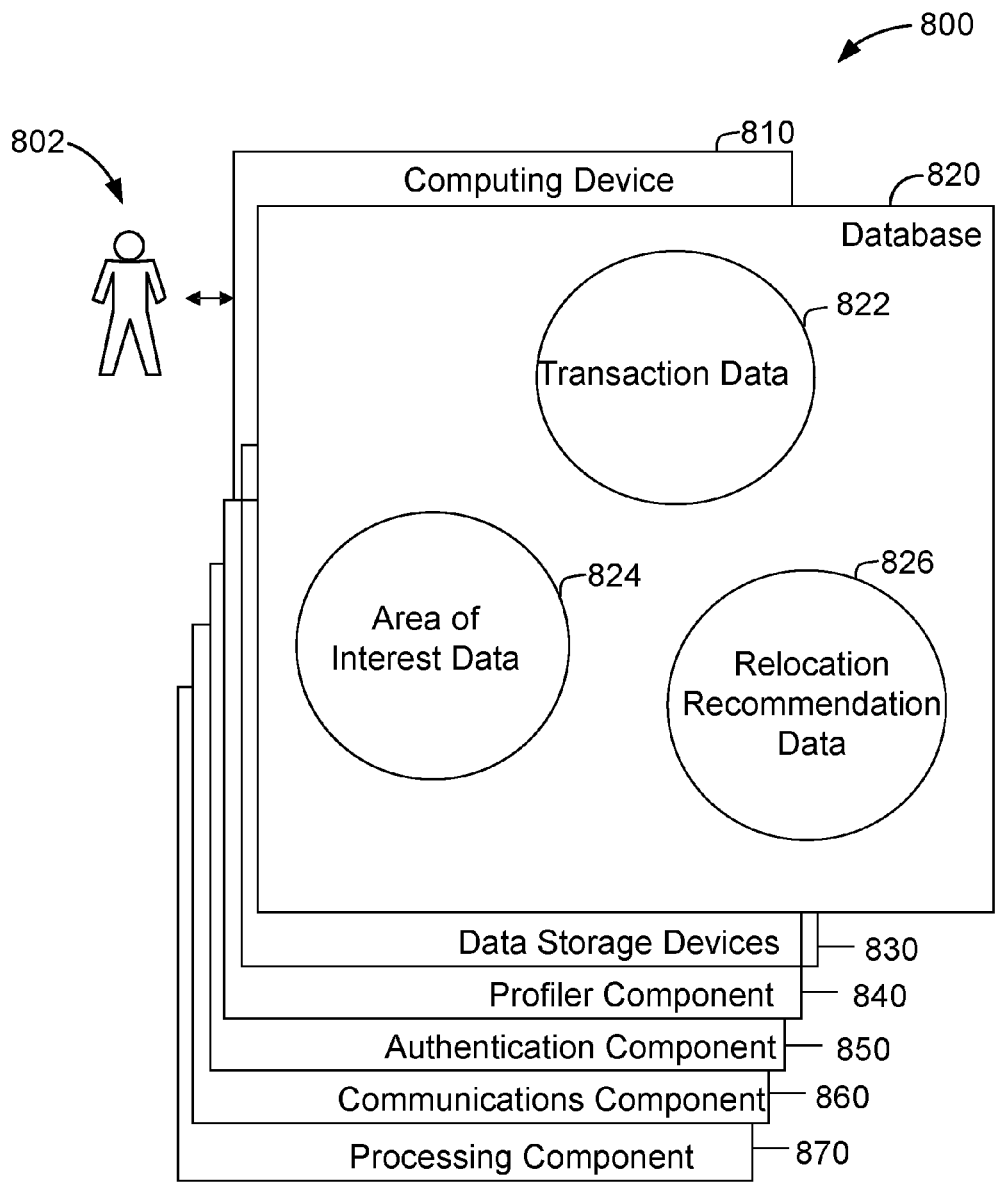

FIG. 8 shows an example configuration 800 of a database 820 within a computing device 810, along with other related computing components, that may be used to generate relocation recommendations. In some embodiments, computing device 810 is similar to server system 112 (shown in FIG. 2), RR computer system 100 (shown in FIGS. 2 and 3) and/or server system 301 (shown in FIG. 5). Database 820 is coupled to several separate components within computing device 810, which perform specific tasks. A cardholder 802 may access computing device 810 to receive relocation recommendations.

In the example embodiment, database 820 includes transaction data 822, area of interest data 824, and relocation recommendation data 826. In some embodiments, database 820 is similar to database 120 (shown in FIG. 2). Transaction data 822 includes information associated with merchant transactions at the prior location, including merchant address, name, transaction date, and transaction amount. Area of interest data 824 includes area of interest listings associated with and/or sorted by merchants and/or cardholders. Relocation recommendation data 826 includes data associated with recommended merchants that RR computer system 100 provides to the relocating cardholder 602 (shown in FIG. 6).

Computing device 810 includes the database 820, as well as data storage devices 830. Computing device 810 also includes a profiler component 840 for capturing and/or creating cardholder profiles. Computing device 810 also includes an authentication component 850 for authenticating a cardholder. A communications component 860 is also included for communicating with other servers or entities during the recommendation process. A processing component 870 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is to generate relocation recommendations for a cardholder. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for determining a relocation recommendation for a relocating cardholder relocating from a first location to a target location, the method implemented using a relocation recommendation (RR) computing device in communication with a memory, said method comprising:
receiving a cardholder identifier for the relocating cardholder, and at least one of a general target area and the target location;
identifying at least one comparison cardholder having initiated payment card transactions within the target location and involving items purchased that are comparable to items purchased by the relocating cardholder;
determining at least one target merchant located within the target location, the at least one target merchant having sold at least one comparable item to the at least one comparison cardholder; and
transmitting, to a relocating cardholder device, a relocation recommendation including a name and a location of the at least one target merchant to the relocating cardholder.

2. A method in accordance with claim 1, further comprising:
generating a cardholder profile including the cardholder identifier for the relocating cardholder;
storing the cardholder profile in the memory; and
assigning an area of interest to the cardholder profile.

3. A method in accordance with claim 1, further comprising assigning the area of interest to the at least one target merchant.

4. A method in accordance with claim 1, further comprising:
retrieving transaction data associated with a transaction initiated by the relocating cardholder with a first location merchant at the first location; and
generating a probability variable representing a probability that the relocating cardholder purchased an item corresponding to the area of interest.

5. A method in accordance with claim 4, further comprising determining that the transaction is initiated using one or more of an expired payment card and a linked payment card, wherein the linked payment card is a card in use by a family member of the cardholder, and wherein the linked payment card is associated with a payment account of the cardholder.

6. A method in accordance with claim 1, wherein identifying the at least one comparison cardholder at the target location comprises identifying that the at least one comparison cardholder has relocated from the first location to the target location within a predetermined time period.

7. A method in accordance with claim 1, further comprising:
retrieving third party data from a third party database;
identifying at least one item identifier from the third party database by comparing transaction data for the relocating cardholder with the third party data; and
identifying that the target merchant offers at least one of a good and a service associated with the at least one item identifier; and
transmitting, to the cardholder computing device, a relocation recommendation including the target merchant.

8. A system for providing recommendations to a relocating cardholder relocating from a first location to a target location, the system comprising:
a database configured to store transaction data, cardholder data, and recommendation data; and
a relocation recommendation (RR) computing device configured to be coupled to the database, the RR computing device further configured to:
receive a cardholder identifier for the relocating cardholder, and at least one of a general target area and the target location;
identify at least one comparison cardholder having initiated payment card transactions within the target location and involving items purchased that are comparable to items purchased by the relocating cardholder;
determine at least one target merchant located within the target location, the at least one target merchant having sold at least one comparable item to the at least one comparison cardholder; and
transmit, to a relocating cardholder device, a relocation recommendation including a name and a location of the at least one target merchant to the relocating cardholder.

9. A system in accordance with claim 8, wherein the RR computing device is further configured to:
generate a cardholder profile for the relocating cardholder;
store the cardholder profile in the memory; and
assign an area of interest to the cardholder profile.

10. A system in accordance with claim 8, wherein the RR computing device is further configured to assign the area of interest to the at least one target merchant.

11. A system in accordance with claim 8, wherein the RR computing device is further configured to:
retrieve transaction data associated with a transaction initiated by the relocating cardholder with a first location merchant at the first location; and
generate a probability variable representing a probability that the relocating cardholder purchased an item corresponding to the area of interest.

12. A system in accordance with claim 11, wherein the RR computing device is further configured to determine that transaction is initiated using one or more of an expired payment card and a linked payment card, wherein the linked payment card is a card in use by a family member of the cardholder, and wherein the linked payment card is associated with a payment account of the cardholder.

13. A system in accordance with claim 8, wherein the RR computing device is further configured to identify that the at least one cardholder has relocated from the first location to the target location within a predetermined time period.

14. A system in accordance with claim 8, wherein the RR computing device is further configured to:
retrieve third party data from a third party database;
identify at least one item identifier from the third party database by comparing transaction data for the relocating cardholder with the third party data; and identify that the target merchant offers at least one of a good and a service associated with the at least one item identifier; and transmit, to the cardholder computing device, a relocation recommendation including the target merchant.

15. A non-transitory computer readable medium that includes computer executable instructions for providing recommendations to a relocating cardholder relocating from a first location to a target location, wherein when executed by a relocation recommendation (RR) computing device, the computer executable instructions cause the RR computing device to:

receive a cardholder identifier for the relocating cardholder, and at least one of a general target area and the target location;

identify at least one comparison cardholder having initiated payment card transactions within the target location and involving items purchased that are comparable to items purchased by the relocating cardholder;

determine at least one target merchant located within the target location, the at least one target merchant having sold at least one comparable item to the at least one comparison cardholder; and transmit, to a relocating cardholder device, a relocation recommendation including a name and a location of the at least one target merchant to the relocating cardholder.

16. A non-transitory computer readable medium in accordance with claim 15, wherein the computer executable instructions cause the RR computing device to:

generate a cardholder profile including the cardholder identifier for the relocating cardholder;

store the cardholder profile in the memory; and assign an area of interest to the cardholder profile.

17. A non-transitory computer readable medium in accordance with claim 15, wherein the computer executable instructions cause the RR computing device to:

retrieve transaction data associated with a transaction initiated by the relocating cardholder with a first location merchant at the first location; and generate a probability variable representing a probability that the relocating cardholder purchased an item corresponding to the area of interest.

18. A non-transitory computer readable medium in accordance with claim 17, wherein computer executable instructions cause the RR computing device to determine the transaction is initiated using one or more of an expired payment card and a linked payment card, wherein the linked payment card is a card in use by a family member of the cardholder, and wherein the linked payment card is associated with a payment account of the cardholder.

19. A non-transitory computer readable medium in accordance with claim 15, wherein the computer executable instructions cause the RR computing device to identify that the at least one cardholder has relocated from the first location to the target location within a predetermined time period.

20. A non-transitory computer readable medium in accordance with claim 15, wherein when executed by a relocation recommendation (RR) computing device, the computer executable instructions cause the RR computing device to:

retrieve third party data from a third party database;

identify at least one item identifier from the third party database by comparing transaction data for the relocating cardholder with the third party data; and identify that the target merchant offers at least one of a good and a service associated with the at least one item identifier; and transmit, to the cardholder computing device, a relocation recommendation including the target merchant.

* * * * *